(No Model.) 3 Sheets—Sheet 1.
B. JONES.
WINDMILL.
No. 455,720. Patented July 7, 1891.
*Fig. 1.*
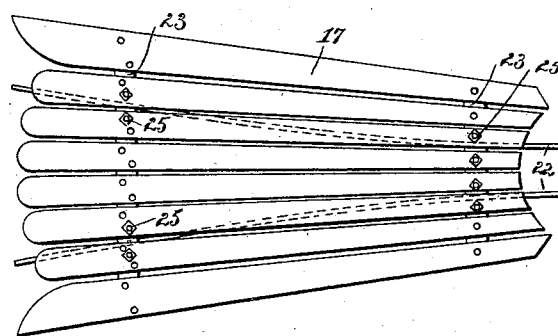
*Fig. 6.*
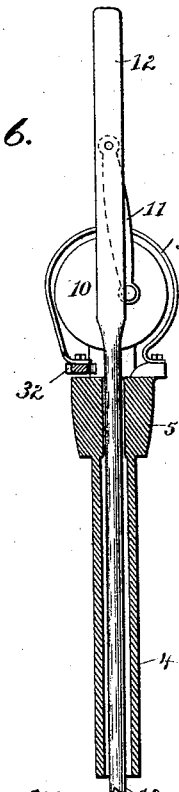
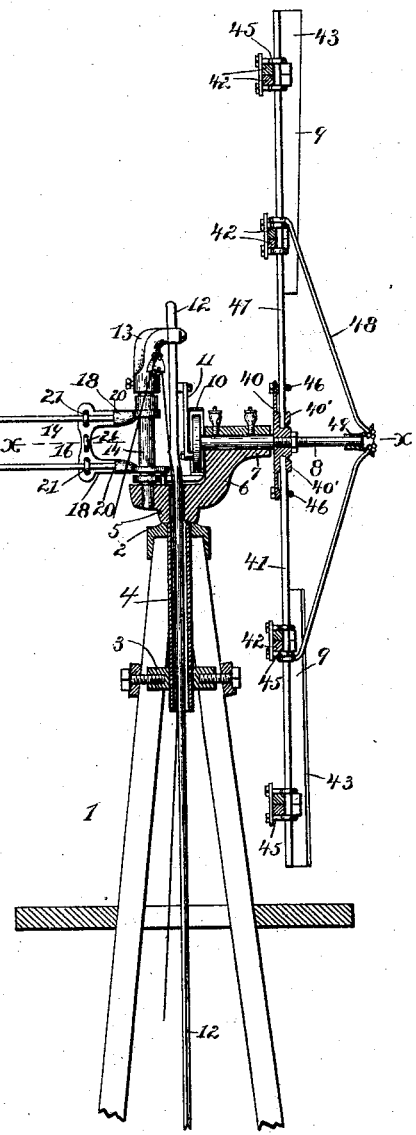
WITNESSES:
INVENTOR
Byron Jones
By Edsen Bros.
Attorneys (No Model.) 3 Sheets—Sheet 2.
B. JONES.
WINDMILL.
No. 455,720. Patented July 7, 1891.
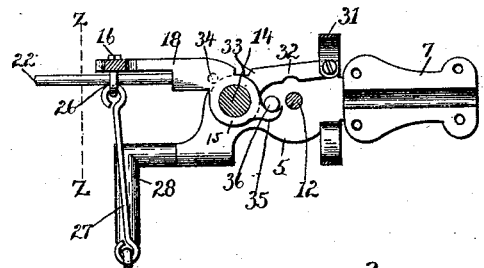
Fig. 2.
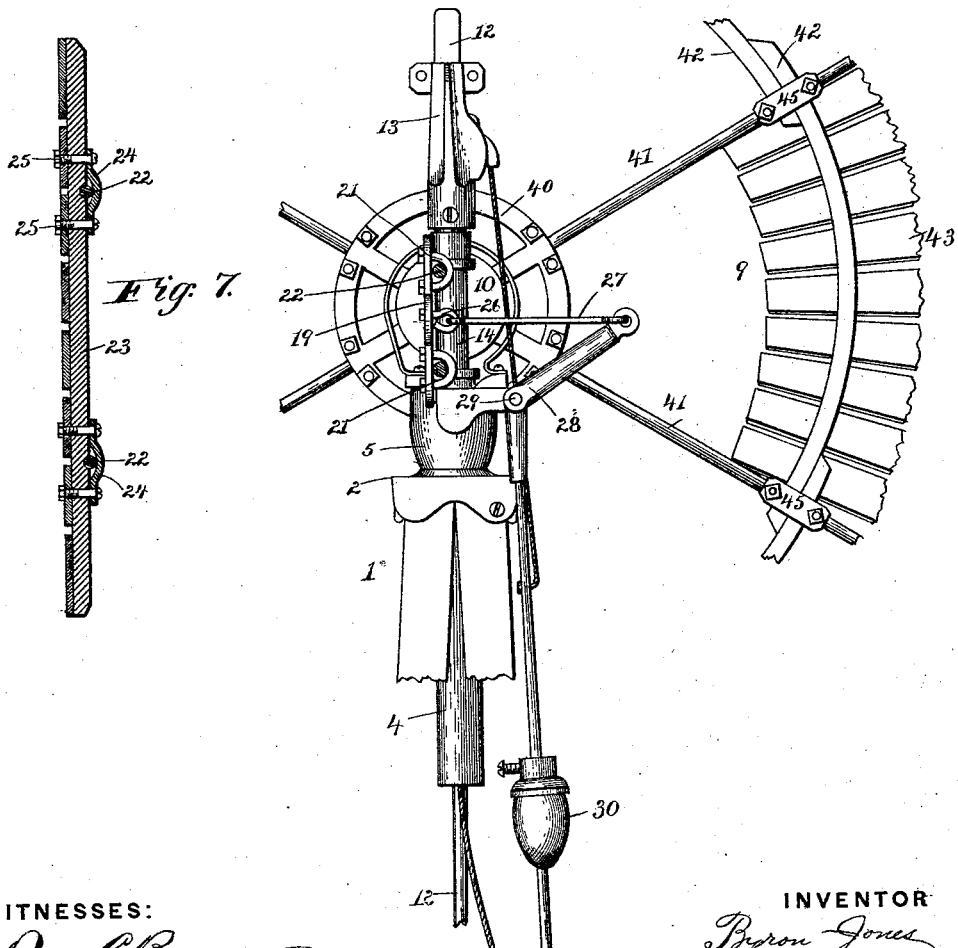
Fig. 3.
Fig. 7.
WITNESSES:
INVENTOR
Byron Jones
By Edwin Bros.,
Attorneys.

(No Model.) 3 Sheets—Sheet 3.
B. JONES.
WINDMILL.
No. 455,720. Patented July 7, 1891.
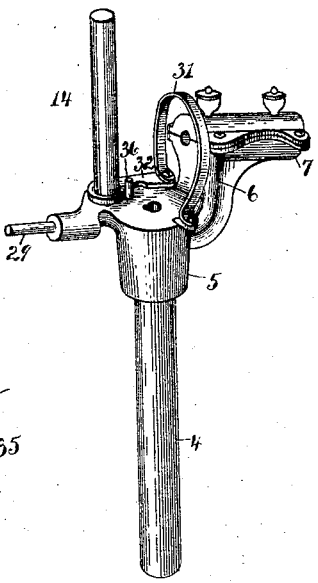
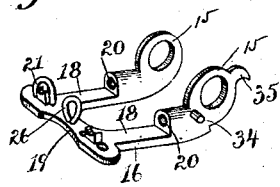
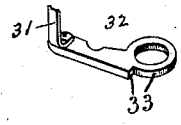
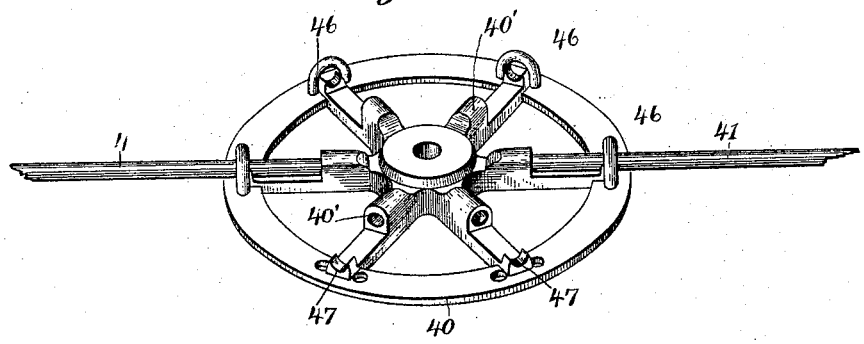
WITNESSES:
INVENTOR
Byron Jones
By Edson Bro's,
Attorneys.

UNITED STATES PATENT OFFICE.

BYRON JONES, OF PORTLAND, INDIANA, ASSIGNOR, BY DIRECT AND MESNE ASSIGNMENTS, TO THE PORTLAND WIND ENGINE COMPANY, OF SAME PLACE.

WINDMILL.

SPECIFICATION forming part of Letters Patent No. 455,720, dated July 7, 1891.

Application filed April 29, 1889. Serial No. 309,029. (No model.)

*To all whom it may concern:*

Be it known that I, BYRON JONES, a citizen of the United States, and a resident of Portland, in the county of Jay and State of Indiana, have invented certain new and useful Improvements in Windmills; and I do hereby declare the following to be a full, clear, and exact description of the invention, such as will enable others skilled in the art to which it appertains to make and use the same.

My invention relates to improvements in windmills; and it consists of the peculiar construction, combination, and arrangement of parts, as will be hereinafter fully described, and particularly pointed out in the claims.

As an understanding of my invention can be had to better advantage by a detailed description thereof, I will now proceed to describe the same in connection with the accompanying drawings, in which—

Figure 1 is an elevation taken from one side of the mill. Fig. 2 is a horizontal sectional view on the plane indicated by the dotted line *x x* of Fig. 1. Fig. 3 is a vertical transverse sectional view on the line *z z* of Fig. 2. Fig. 4 is an enlarged detail perspective view of the turn-table detached from the wheel and tower and showing the brake mechanism. Fig. 5 is an enlarged detail view of the central hub of the wheel, and Figs. 6, 7, 8, and 9 are detail detached views of parts of my improvements.

Like numerals of reference denote corresponding parts in all the figures of the drawings, referring to which—

1 designates the tower of a windmill, which is of the ordinary well-known construction, and to the upper end of this tower is fixed two bearings 2 3, which are in vertical alignment to receive the tubular stem 4 of a horizontally-turning turn-table 5, that rests upon the upper bearing 2 and is free to turn thereon. At one side of its center this turn-table has an integral vertical arm or standard 6, the upper end of which is enlarged to form the lower part of a bearing 7 to receive a short horizontal wheel-shaft 8. To one end of this wheel-shaft 8 is secured a vertical wind-wheel 9, to be hereinafter described, and to the opposite end of said wheel-shaft is secured a crank-disk 10, having a pitman 11 pivoted thereto at one side of its center, the opposite end of this pitman being pivoted to the upper extremity of a vertically-reciprocating rod 12, that passes centrally through the tubular stem and a vertical opening in the turn-table. The upper end of the reciprocating rod is guided in an overhanging guide 13, that is formed integral with a vertical standard 14, fixed on or integral with the turn-table on the opposite side of the standard 6, and below this guide the standard is reduced in diameter to adapt it to receive a cross-head 15, formed integral with the hinge-casting 16, that carries the vane 17 of the mill. This hinge-casting consists of the two parallel arms 18, the transverse integral arm 19, and the cross-head 15, all of which are made or cast in a single piece. The cross-head 15 fits snugly around the vertical shaft 14, and the opposite ends of the arms, on which the cross-head is formed, are connected by the transverse arm. The parallel arms are each provided on one of the lateral faces thereof with integral sockets 20, which are arranged out of line with the transverse connecting-arm, and to said plate or bar are detachably connected clips 21, that align with the open-ended sockets 20 of the hinge-casting, the threaded ends of the clips being passed through transverse perforations in the connecting-arm and receive nuts that draw upon the clips and cause them to bind on the vane-rods 22. These vane-rods are fitted at their inner extremities in the open-ended sockets 20 of the hinge-casting and pass through the clips, by means of which the vane-rods are firmly but detachably secured to the hinge-casting. The vane itself is of the ordinary pattern well known to those skilled in this art, and to the transverse bars 23 of the vane are bolted sockets 24, through which are passed the vane-rods 22, which are securely held in place by means of binding-screws 25, that work in threaded openings in the sockets and bind on the vane-rods. By means of these fixed sockets on the vane and the binding-screws the vane can be adjusted nearer to or farther from the hinge-casting, and thereby adapt the vane to swing or turn under varying pressures of the wind.

An eye 26 is provided on the transverse bar of the hinge-casting between the clips 21, and to this eye is pivoted one end of a link 27, which is connected at its other end to an angular arm of a lever 28, said lever being fulcrumed at an intermediate point of its length in an integral horizontal lug 29 on one side of the turn-table, and further provided with an adjustable weight 30 at its outer free end. This weighted arm serves to counterbalance the vane and to hold the same against movement under a wind of a given pressure or strength; but when the force of the wind exceeds the pressure to which the weighted arm is adjusted the latter swings or turns on its hinge-casting and operates to apply the brake mechanism against the wheel-shaft, and thus retard the latter to prevent breakage or damage thereto.

The vane is normally held by the weighted lever in line with the wheel-shaft, and its hinge-casting is free to turn on the turn-table in one direction a limited distance before applying the brake mechanism, which consists, essentially, of a spring band or strap 31 and a lever 32, which are peculiarly constructed and adapted for operation in the manner which I will now describe. The spring band or strap is fitted around the crank-disk of the wheel so as to be normally out of contact with the periphery thereof, and one end of this band is permanently fastened to the turn-table, while its other end is secured to one end of the brake-lever 32, which is arranged in a horizontal position close to the upper side of the turn-table. One end of this lever is pivoted or fulcrumed on the lower extremity of the vertical standard 14 close to the point where the latter is united to the turn-table and beneath the inner end of the lower arm of the hinge-casting, and in one of its side edges at its pivotal end this lever is provided with a curved surface 33, against which impinges or rides a depending pin 34 on the lower side of the lower parallel arm of the hinge-casting.

The hinge-casting is further provided with a stop-shoulder 35, which is adapted to impinge against a fixed stop 36 on the turn-table to prevent the vane from being drawn beyond the line of the wheel-shaft in one direction under the influence of the weighted lever, so that the lever normally holds the vane in line with the wheel-shaft; but when a high wind suddenly strikes the vane laterally the weighted lever is raised and the vane swings at right angles to the wheel-shaft, thus causing the pin 34 to ride against the inclined surface 33 of the lever 32 and force the free end of the latter toward the wheel-shaft, which thus draws upon the brake-band and applies the latter forcibly against the crank-disk, thereby retarding or arresting the rotations of the wind-wheel. Injury or damage to the wheel is thus avoided, and the brake mechanism is automatically applied to and released from the wheel simply by pressure of the wind on the vane.

I attach especial importance to the peculiar construction and arrangement of the brake mechanism herein described, as the parts are simple, compactly arranged, and exceedingly efficient and reliable in service.

I will now proceed to describe my improved wind-wheel, which consists, essentially, of a central hub 40, a series of radial tubular spokes 41, the annular bands 42, and the blades 43, which are constructed and arranged in the peculiar manner presently described.

Each annular band 42 is made up of a series of segmental members or parts, the members of each band overlapping each other at their meeting ends, and these segmental members of the bands are united together and to the radial spokes of the wheels by means of clips 45, which consist, essentially, of two eye-bolts that embrace the tubular spokes on opposite sides of the meeting lapped ends of the segmental band-sections, and of transverse plates, through which are passed the threaded ends of the eyebolts and which bear against one side of the meeting lapped ends of said band-sections, as is obvious by an inspection of the detailed views of the drawings.

The central hub 40 of my improved wind-wheel is provided at its center with a transverse opening to receive the outer end of the wheel-shaft, and on the inner extremities of the radial spokes of this central hub are cast a series of radial sockets 40', that lie on one of the lateral faces of the hub and are arranged in line with removable clips 46, which are passed through transverse perforations in the rim of the hub. The inner ends of the radial spokes are fitted in these sockets and in recessed seats 47, formed in the rim of the hub, and these spokes are securely held in place by the sockets and seats and by the clips which bind on the spokes. The spokes are braced by means of inclined rods 48, which are connected at their outer ends to an extension 49 of the wheel-shaft and at their inner ends to the spokes at a point between the annular bands 42 of the wheel. The blades of the wheel are set in recesses in the annular bands in the usual manner.

I attach especial importance to a wheel constructed in the manner described, with the central hub and radial spokes secured in the hub, as specified, as a wheel so constructed is exceedingly light, strong, and simple in construction, and can be economically manufactured and repaired.

The operation and advantages of my invention will be readily understood and appreciated by those skilled in the art from the foregoing description, taken in connection with the drawings.

Slight changes in the form and proportion of parts and details of construction can be made without departing from the spirit or sacrificing the advantages of my invention.

Having thus fully described my invention, what I claim as new, and desire to secure by Letters Patent, is—

1. In a windmill, the combination, with a turn-table having a vertical standard 14 and a vane provided with longitudinal rods, of a hinge-casting having the parallel arms united at one end by a transverse arm and having at its opposite end a cross-head which is fitted on said standard of the turn-table, the casting being further provided with lateral integral sockets near its cross-head and with detachable clips arranged in line with the sockets, in which sockets and the clips are fitted the inner ends of the longitudinal vane-rods, substantially as and for the purpose described.

2. A wind-wheel consisting of a central hub having the integral sockets 40' on one of the lateral faces thereof near the center and arranged radially of the same, and with the integral recessed seats 47 arranged near the periphery of said hub and in line with the radial sockets 40', the radial spokes fitted in said sockets and in the seats of the hub, the clips passing transversely through the rim of the hub opposite to the seats and embracing the spokes to clamp the same tightly upon the seats, the annular bands, and the blades, substantially as described.

In testimony whereof I affix my signature in presence of three witnesses.

BYRON JONES.

Witnesses:
PATTERSON M. HEARN,
CHAS. W. RISTINE,
J. H. WINTERS.